(12) United States Patent
Gupta et al.

(10) Patent No.: US 7,693,244 B2
(45) Date of Patent: Apr. 6, 2010

(54) ENCODING, CLOCK RECOVERY, AND DATA BIT SAMPLING SYSTEM, APPARATUS, AND METHOD

(75) Inventors: Sunil Gupta, Austin, TX (US); Rodney R. Rozman, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 1015 days.

(21) Appl. No.: 11/394,605

(22) Filed: Mar. 31, 2006

(65) Prior Publication Data

US 2007/0230648 A1    Oct. 4, 2007

(51) Int. Cl.
*H04L 7/00* (2006.01)
(52) U.S. Cl. ...................... 375/355; 375/326
(58) Field of Classification Search .............. 375/355, 375/326
See application file for complete search history.

(56) References Cited

U.S. PATENT DOCUMENTS

2004/0251944 A1*   12/2004   Ma ............................ 327/198

* cited by examiner

Primary Examiner—Kevin Y Kim
(74) Attorney, Agent, or Firm—Kacvinsky LLC

(57) ABSTRACT

A system, apparatus, method and article to encode, clock recover, and sample data bits are described. The apparatus may include a pulsed digital module comprising a first clock input, a first data input, a data output, and a reset input. The first clock input to receive an encoded signal from a single-wire. The encoded signal comprising a serial bit sequence comprising a clock signal embedded encoded data bit. The pulsed digital module to capture an edge of the encoded signal at the first clock input in accordance with a logic level coupled to the first data input. A delay module comprising a delay input is coupled to the data output and a delay output is coupled to the reset input. The delay module to delay the captured edge by a predetermined period and to generate a delay signal from the delay output after the predetermined period. The pulsed digital module is to generate a first clock edge of the sampling clock at the data output after the predetermined period. An apparatus, system, and method to embed a sampling clock signal via an encoded signal comprising n bits and to transmit the encoded signal to a single-wire as a serial bit sequence of n bits. The encoded signal represents a logic bit having an encoding clock period $T_{CLK}$. Other embodiments are described and claimed.

25 Claims, 6 Drawing Sheets

US 7,693,244 B2

ENCODING, CLOCK RECOVERY, AND DATA BIT SAMPLING SYSTEM, APPARATUS, AND METHOD

BACKGROUND

Various serial communication techniques may be employed in different scenarios. For reliable communication, some techniques may require that both data and sampling clock signals be sent over separate wires. Among the various techniques, two-wire or two-channel communication techniques such as synchronous, non-return to zero (NRZ), and bipolar return-to-zero (BRZ). In synchronous communications an explicit clock signal is transmitted on a separate wire. NRZ is an encoding method where a logic '1' is transmitted as a high value and a logic '0' is transmitted as low value (or vice versa also where a logic '1' is transmitted as a low value and a logic '0' is transmitted as a high value). An NRZ signal can be transmitted ion a single wire, but it will be very unreliable to get the correct bits at the receiver without an explicit clock. BRZ is an encoding or signaling method where the signal returns to a rest state between high and low states, usually referred to as zero state. A BRZ signal can be transmitted on a single wire and bits may be recovered reliably at the receiver because a BRZ signal has an edge available in each bit period.

Among the various communication techniques, one-wire or one-channel encoding techniques such as Manchester and 8b/10b may employ complicated phase-locked loop (PLL), delay-locked loop (DLL) circuits, and training sequences to recover an embedded sampling clock signal. Manchester encoding is a method of translating a logic '1' into a low to high transition and a logic '0' into a high to low transition (or vice versa, original '1'→01, original '0'→10, and vice versa). Furthermore, 8b/10b is a method of encoding 8-bit data bytes to 10-bit transmission characters. There is a need for an encoding technique and a corresponding sampling clock recovery technique where an encoded signal comprising data and sampling clock signals may be transmitted on a single-wire. There is a need for an encoding technique to generate an encoded signal as a serial bit stream and a corresponding clock recovery technique that does not require complicated PLL/DLL circuits and training sequences to recover the sampling clock signal.

DETAILED DESCRIPTION

Figures 1A, 1B:
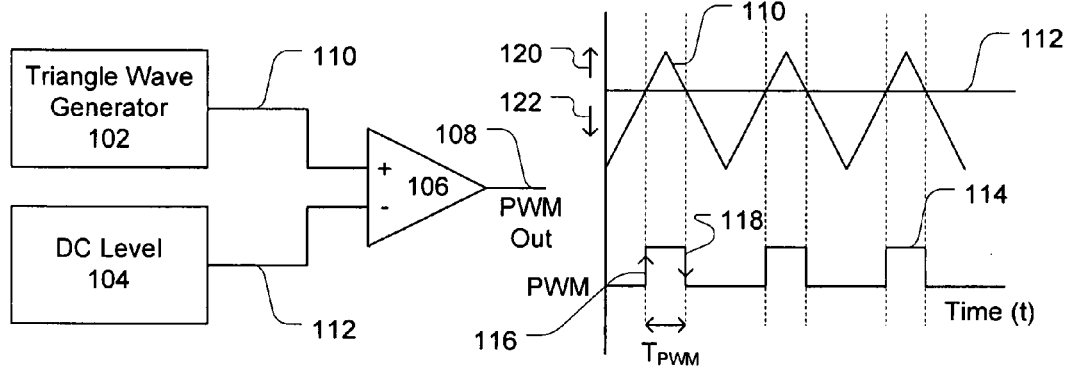
FIG. 1A illustrates a conventional pulse-width-modulation (PWM) technique.
FIG. 1B illustrates waveforms associated with the conventional PWM technique shown in FIG. 1A.

FIG. 1A illustrates a conventional pulse-width-modulation (PWM) technique and FIG. 1B illustrates the corresponding waveforms associated with the conventional PWM technique of FIG. 1A. PWM system 100 comprises a triangle wave generator 102 to produce triangular/sawtooth waveform 110 (triangle wave) and direct current (DC) level generator 104 to produce a trigger reference voltage 112. Triangle wave 110 is applied to the non-inverting input of comparator 106 and trigger reference voltage 112 is applied to the inverting input of comparator 106. Accordingly, when triangle wave 110 crosses trigger reference voltage 112 in a positive direction, it produces a rising edge 116 of PWM waveform 114. When triangle wave 110 crosses trigger reference voltage 112 in a negative direction, it produces a falling edge 118 of PWM waveform 114. The pulse width period $T_{PWM}$ of PWM waveform 114 may be controlled by shifting trigger reference voltage 112 up or down. For example, shifting trigger reference voltage 112 up 120 decreases the pulse width $T_{PWM}$ and shifting trigger reference voltage 112 down 122 increases the pulse width $T_{PWM}$. The illustrated mechanism for generating conventional PWM waveform 114 requires triangle wave 110 generator 102, DC level generator 104, and comparator 106.

Embodiments of the encoding techniques described herein comprise a sampling clock signal embedded within a data signal to be transmitted over a serial link. At a receiver end, the sampling clock signal is recovered and is used to capture the individual bits of the data signal with a shift-register, for example. The sampling clock signal is used to capture or store individual bits of the data signal into a shift-register, for example. Accordingly, various embodiments may be generally directed to a system, apparatus, and method for encoding a sampling clock signal with a data signal in a serial bit stream, recovering the sampling clock signal, and sampling the data bit within the encoded serial bit sequence using the recovered sampling clock signal. In one embodiment, for example, a pulsed digital module comprising a first clock input, a first data input, a data output, and a reset input receives an encoded data signal. The first clock input is to receive the encoded signal from a single-wire. The encoded signal comprises a serial bit sequence comprising a clock signal embedded encoded data bit. The pulsed digital module is to capture an edge of the encoded signal at the first clock input in accordance with a logic level coupled to the first data input. A delay module comprises a delay input coupled to the data output and a delay output coupled to the reset input. The delay module is to delay the captured edge by a predetermined period and to generate a delay signal from the delay output after the predetermined period. The pulsed digital module is to generate a first clock edge of the sampling clock at the data output after the predetermined period.

In this manner, various embodiments of serial communication techniques may be employed in different implementations using a single-wire interface. The single-wire interface carries both data and sampling clock signal (e.g., information) encoded in a single serial bit stream. This provides a communication technique wherein data and sampling clock signals may be encoded and transmitted in a single-wire rather than being encoded and transmitted over separate wires. In addition, embodiments of single-wire communication techniques comprising data and sampling clock signals encoded in one signal may be incorporated (integrated) into semiconductors for communication systems, for example.

Embodiments of the single-wire communication techniques comprise a sampling clock recovery module and a bit sampling/strobing module that do not employ training sequences for operation and do not employ complex PLL/DLL circuitry. Furthermore, embodiments of the single-wire communication techniques may generate encoded signals using a digital encoder and may not require additional complicated circuits such as analog circuits, triangular wave generator, thresholder, comparator, and the like, to generate the pulse-width-modulated signal, for example. Embodiments of the single-wire communication techniques may be incorporated in design-for-test (DFT) techniques for flash memory, for example. Embodiments of the single-wire encoding techniques may be used in serial device-to-device (e.g., integrated circuit-to-integrated circuit) communications among other devices that employ a serial single-wire communication interface. Other embodiments may be described and claimed.

Various embodiments may comprise one or more elements. An element may comprise any structure arranged to perform certain operations. Each element may be implemented as hardware, software, firmware, or any combination thereof, as desired for a given set of design parameters or performance constraints. Although an embodiment may be described with a limited number of elements in a certain topology by way of example, the embodiment may include additional or fewer elements in alternate topologies as may be desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments of encoding techniques to encode data and sampling clock signals in one encoded signal to be transmitted along a single communication channel, line, or wire are disclosed and described. Various embodiments of sampling clock recovery techniques are described herein. Sampling clock recovery techniques may be employed to receive a single encoded signal in the form of a serial bit stream and to extract or recover the sampling clock and data signals embedded therein. Various embodiments may comprise, for example, coded-pulse-width-modulation (CPWM) encoding techniques for serial data communication. The CPWM encoding technique digitally encodes a data signal and a sampling clock signal in a single serial data bit stream, which may be transmitted in a single-wire or a single channel. The encoded data signal is transmitted as a single serial data bit stream in the single-wire or single-channel. The encoded data signals may be transmitted in a single-wire in a wired communication system or a single-channel in a wireless communication system. The term single-wire is used herein to refer to both a single wired communication channel as well as a single wireless communication channel to transmit or receive the encoded data signals at a certain data rate. The single-wire technique may be replicated on any number of n-wires to obtain a data rate of n times the single-wire data rate if so desired. Reference to multiple-wires, e.g., two-wires, means that both clock and data signals are transmitted in separate wired or wireless communication channels.

Embodiment of the encoding techniques described herein may be employed in any single-wire serial input/output (I/O) communication system for communicating information from one device to another at a predetermined data rate. One embodiment comprises a sampling clock recovery technique to receive an encoded signal comprising a data signal and a sampling clock signal and to extract or recover the sampling clock signal from the encoded signal. The sampling clock signal is then used to sample or strobe the data signal. The sampling clock recovery techniques do not employ PLL/DLL circuits and training sequences. In addition, the clock recovery technique may be adapted to receive a single-wire serial I/O encoded bit stream. In one embodiment, the encoding and sampling clock recovery techniques may be employed to encode data and embed a sampling clock signal in a CPWM format and to transmit the encoded signal as a serial data bit stream over a single-wire I/O link or channel. In one embodiment, CPWM encoding and corresponding sampling clock recovery techniques may be employed to communicate information with a flash device (e.g., memory). In other embodiments, CPWM encoding and sampling clock recovery techniques may be employed in flash device test systems known as DFT systems, for example.

Figure 2A:
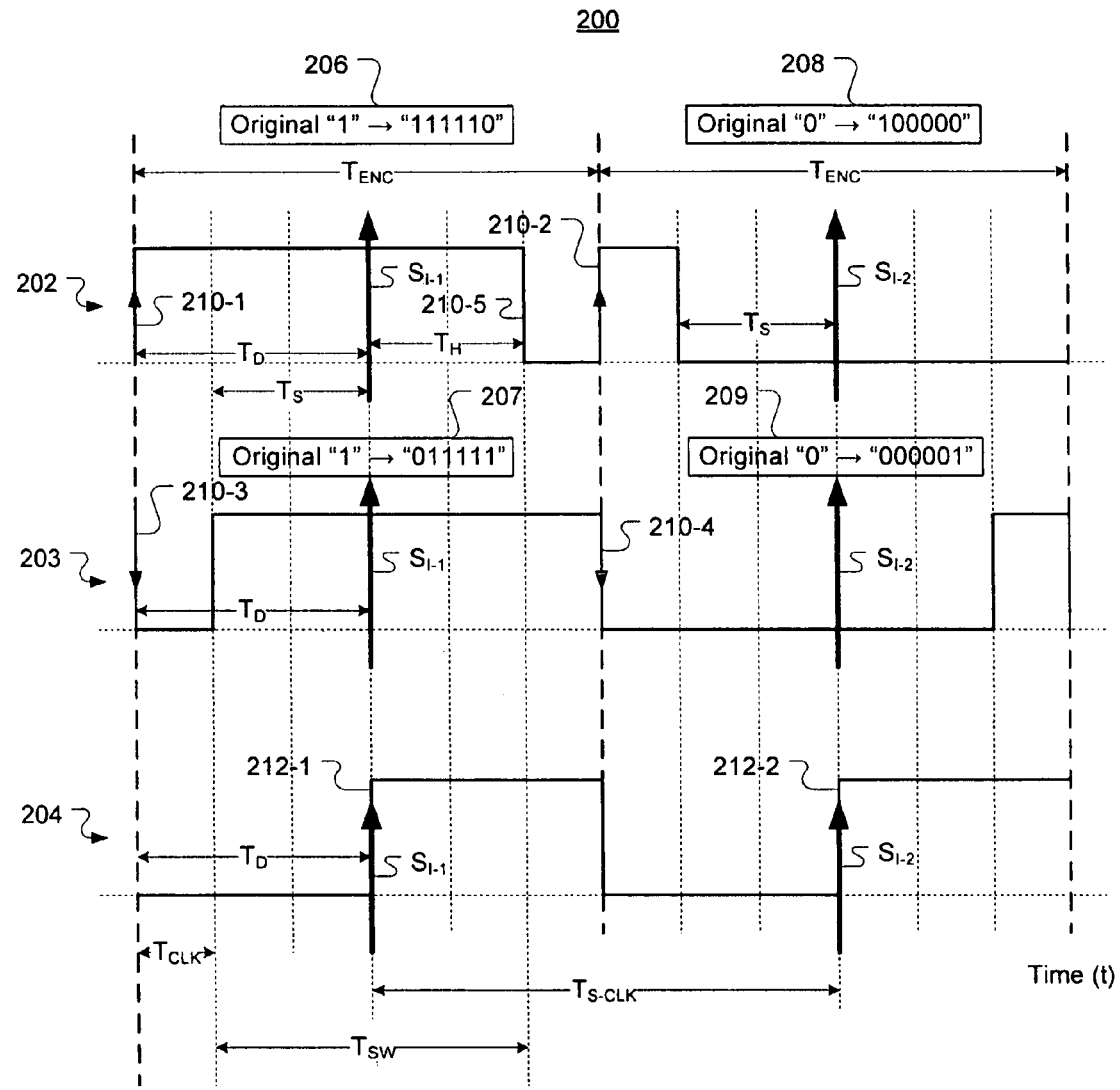
FIG. 2A illustrates one embodiment of a diagram of an encoded data signal and a recovered sampling clock signal.

FIG. 2A illustrates one embodiment of a diagram of encoded data signals and a recovered sampling clock signal. FIG. 2A illustrates a diagram 200. Diagram 200 shows encoded data signals 202 and 203 generated by an encoder module employing a 1:6 CPWM encoding technique. The principles, however, may be applied to an encoder module employing a 1:n encoding technique, for example. An encoder module is used herein to refer to any encoding device, digital or otherwise, and may be implemented in hardware, software, firmware, or any combination thereof to perform the encoding functions described herein. In one embodiment, encoded data signals 202, 203 comprise a sampling clock signal 204 embedded within a data signal (e.g., individually encoded logic '1' or logic '0' bits). Encoded data signal 202 may be encoded and transmitted or driver by the encoder module as a serial bit stream over a single-wire from a transmitter to a receiver, or other logic circuit, for example. Encoded data signals 202, 203 comprise a series of n bits to encode original logic '1' bit sequences 206, 207 or original logic '0' bit sequences 208, 209 distributed over an encoding period $T_{ENC}$ comprising n encoding clock periods $T_{CLK}$. In the illustrated embodiment, an original logic '1' may be encoded as bit sequence 206 '$1_1 1_2 1_3 \ldots 1_{n-1} 0_n$' or bit sequence 207 '$0_1 1_2 1_3 \ldots 1_{n-1} 1_n$' where n=6. Likewise, an original logic '0' may be encoded as bit sequence 208 '$1_1 0_2 0_3 \ldots 0_{n-1} 0_b$' or bit sequence 209 '$0_1 0_2 0_3 \ldots 0_{n-1} 1_n$' where n=6. Encoded data signals 202, 203 also comprise sampling clock signal 204 embedded therein.

Encoded data signals 202, 203 may be encoded in a 1:n bit pattern employing a rising edge or a falling edge encoding mode. As used herein, a rising edge is used to describe a low-to-high signal transition and falling edge is used to describe a high-to-low signal transition. Accordingly, clock recovery module 304 (FIG. 3) may be adapted to recover sampling clock signal 204 based on corresponding rising edge or falling edge encoding technique. In a rising edge mode, sampling clock recovery module 304 may be adapted to recover sampling clock signal 204 based on rising edges 210-1, 210-2 of encoded data signal 202. In a falling edge mode, sampling clock recovery module 304 may be adapted to recover sampling clock 204 based on falling edges 210-3, 210-4 of encode data signal 203.

In a rising edge mode, an original logic '1' data bit may be encoded as original logic '1' bit sequence 206. Original logic '1' bit sequence 206 is a serial bit stream comprising n bits. The first n-1 bits are logic '1' and the $n^{th}$ bit is a logic '0'. An original logic '0' data bit may be encoded as original logic '0' bit sequence 208. Original logic '0' bit sequence 208 is a serial bit stream comprising n bits. The first bit is a logic '1' and the remaining n-1 bits are logic '0'. In a rising edge encoding mode, whether an original logic '1' or '0' data bit is to be encoded and transmitted, the $n^{th}$ bit is a logic '0' such that each original logic '1' or logic '1' bit sequence 206, 208 begins with respective rising edges 210-1, 210-2. One embodiment of a rising edge encoding technique may be illustrated as follows:

Logic '1' → '$1_1 1_2 1_3 \ldots 1_{n-1} 0_n$';

Logic '0' → '$1_1 0_2 0_3 \ldots 0_{n-1} 0_b$'

In a rising encoding technique, when the encoder module receives an original logic '1' it outputs logic '1' bit sequence 206 '$1_1 1_2 1_3 \ldots 1_{n-1} 0_n$', and when the encoder module receives an original logic '0' it outputs logic '0' bit sequence 208 '$1_1 0_2 0_3 \ldots 0_{n-1} 0_n$'. This n bit encoding technique ensures that every original logic '1' and '0' data bits are represented with pulses of different width. In one embodiment, a rising edge encoding technique may comprise a CPWM rising edge encoding technique, for example. As previously described, rising edges 210-1, 210-2 are generated by the encoder module at the beginning of each n-bit encoded sequence 206, 208 such that each logic '1' or logic '0' bit sequence 206, 208 begins with a logic '1' and ends with a logic '0'. As previously stated, in the illustrated embodiment the encoding technique for bit sequences 206, 207, 208, 209 is 1:6.

In a falling edge encoding mode, encoded data signal 203 is encoded such that falling edges 210-3, 210-4 initiate respective logic '1' or logic '0' bit sequences 207, 209. Accordingly, clock recovery module 304 may be adapted to recover sampling clock signal 204 based on falling edges 210-3, 210-4. For an original '1' data bit, the first bit is logic '0' and the remaining n-1 bits are logic '1' and the $n^{th}$ bit is a logic '1'. For an original '0' data bit, the first n-1 bits are logic '0' and the $n^{th}$ bit is a logic '1'. In either case, whether an original '1' or '0' data bit is encoded, the '1' bit is a logic '0'. One embodiment of a falling edge encoding technique may be illustrated as follows:

Logic '1' → '$0_1 1_2 1_3 \ldots 1_{n-1} 1_n$';

Logic '0' → '$0_1 0_2 0_3 \ldots 0_{n-1} 1_2$'

In a falling edge encoding technique, when the encoder module receives an original logic '1' it outputs logic '1' bit sequence 207 '$0_1 1_2 1_3 \ldots 1_{n-1} 1_n$', and when the encoder module receives an original logic '0' it outputs logic '0' bit sequence 209 '$0_1 0_2 0_3 \ldots 0_{n-1} 1_n$'. This n bit encoding technique also ensures that every original logic '1' and '0' data bits are represented with pulses of different width. In one embodiment, a falling edge encoding technique may comprise a CPWM falling edge encoding technique, for example. As previously described, falling edges 210-3, 210-4 are generated by encoder module at the beginning of each n-bit encoded sequence 207, 209 such that each logic '1' or logic '0' bit sequence 206, 208 begins with a logic '0' and ends with a logic In the illustrated embodiment, diagram 200 shows rising edge encoded data signal 202 and falling edge encoded data signal 203 waveforms for a 1:6 rising edge and falling edge encoding modes, respectively. The encoding clock period of each original logic '1' or '0' data bit is $T_{CLK}$. Each of the respective 6-bit original logic '1' or logic '0' bit sequences 206, 208 are encoded in six encoding clock periods $6 \cdot T_{CLK}$ over an encoding period $T_{ENC}$. As shown in diagram 200, in a rising edge encoding mode, rising edges 210-1, 210-2 of encoded data signal 202 are generated by the encoder module for each of the 6-bit sequences 206, 208 such that they always begin with a logic '1' and end with a logic '0'. In a rising falling encoding mode, falling edges 210-3, 210-4 of encoded data signal 203 are generated by the encoder module for each of the 6-bit sequences 207, 209 such that they always begin with a logic '0' and end with a logic '1'.

In a rising edge sampling technique, when rising edge 210-1 is detected, original logic '1' bit sequence 206 is sampled at first sampling instant $S_{1-1}$ by sampling clock rising edge 212-1 as may be generated by sampling clock recovery module 304 (FIG. 3), for example. At sampling instant $S_{1-1}$ original logic '1' data bit is captured or stored in a storage device, e.g., shift register 314 (FIG. 3), by sampling clock rising edge 212-1. Shift register 314 also shifts the data bit when it is activated by sampling clock rising edge 212-1. Sampling instant $S_{1-1}$ occurs after a predetermined delay period $T_D$. In the illustrated embodiment, for example, sampling instant $S_{1-1}$ occur after a delay $T_D$ equal to three encoding clock periods $3 \cdot T_{CLK}$. Thus, a first sampling clock rising edge 212-1 is produced at the first sampling instant $S_{1-1}$ after period $T_D$ of detecting rising edge 210-1 of incoming encoded data signal 202. Falling edge 210-5 marks the beginning of the last '0' of original logic '1' bit sequence 206 and may occur after a predetermined hold period $T_H$, for example.

A second rising edge 212-2 of sampling clock signal 204 is produced at second sampling instant $S_{1-2}$. When the second rising edge 210-2 is detected, sampling clock 204 samples original logic '0' bit sequence 208. There is at least a minimum set-up time period $T_S$ that elapses before a bit sequence 206, 208 is sampled after the rising edges 210-1, 210-2 are detected. At sampling instant $S_{1-2}$, original logic '0' data bit is captured or stored in a storage device, e.g., shift register 314 (FIG. 3), by sampling clock rising edge 212-2. Shift register 314 also shifts the data bit when it is activated by sampling clock rising edge 212-1. The sampling clock period $T_{S-CLK}$ may be measured between the first and second rising edges 212-1, 212-2.

Although FIG. 2A illustrates a 1:6 encoding technique, various other embodiments may provide other encoding techniques, including, but not limited to, 1:3, 1:4, up to 1:n encoding techniques for both rising edge and falling edge encoding modes. A 1:3 (i.e., n=3) encoding technique may be sufficient to distinctly represent an original logic '1' or logic '0' data bit. Each encoding technique, however, affects the pulse duration of the original logic '1' or logic '0' bit sequences and, thus impacts the effective data rate and sampling window $T_{SW}$. The larger encoding techniques such as 1:4, 1:6 or 1:n will result in longer pulse durations and thus slower effective data rates. In one embodiment, larger sampling windows can tolerate larger recovered sampling clock signals processes, voltages, and temperature (PVT) variances.

Table 1 shows the bit sequences for 1:3, 1:4, 1:6, and 1:n for rising edge encoding mode encoded data signal 202.

TABLE 1

| Original Data Bit | 1:3 Encoded Data Bit | 1:4 Encoded Data Bit | 1:6 Encoded Data Bit | 1:n Encoded Data Bit |
|---|---|---|---|---|
| '1' | '110' | '1110' | '111110' | '$1_1 1_2 1_3 \ldots 1_{n-1} 0_n$' |
| '0' | '100' | '1000' | '100000' | '$1_1 0_2 0_3 \ldots 0_{n-1} 0_n$' |

These illustrated CPWM encoding techniques ensure that every original '1' and '0' data bits are represented with pulses of different widths. Rising edge encoding mode feature of encoded data signal 202 is exploited in clock recovery circuit 304 (FIG. 3), which may be adapted to match the particular rising edge or falling edge encoding technique. First rising edge 212-1 of sampling clock signal 204 may be delayed by one-half the encoding clock period $T_{ENC}$, which is then used to sample or strobe encoded data signal 202. Individual bits of encoded data signal 202 may be shifted out of a shift-register 314 (FIG. 3) at the occurrence of sampling clock 204 rising edges 212-1, 212-2, for example. Delay module 308 (FIG. 3) generates a suitable delay period $T_D$.

The encoding clock period for each original logic '1' or '0' bit is $T_{CLK}$. For a 1:n encoding technique, a suitable the sampling window period $T_{SW}$ may be given by:

$$T_{SW}(1:n) = +/- [(n-2)/2] T_{CLK}$$

For a 1:6 encoding technique, for example, a suitable sampling window period $T_{SW}(1:6)$ may be given by:

$$T_{SW}(1:6) = +/- 2 T_{CLK}$$

In one embodiment, the encoding clock period may be $T_{CLK} = 50$ ns (20 MHz), then $T_{SW} = +/- 100$ ns.

The larger encoding techniques decrease the effective data rate in bits/s. Table 2 below shows the effective data rate for various CPWM encoding techniques. For example, the effective data rate for 1:6 encoding is R/6 bits/s, where R is the original data rate.

TABLE 2

| Original Data Bit | 1:3 Encoded Data Bit | 1:4 Encoded Data Bit | 1:6 Encoded Data Bit | 1:n Encoded Data Bit |
|---|---|---|---|---|
| R | R/3 | R/4 | R/6 | R/n |

As discussed above, original logic '1' and logic '0' data bits may be encoded using a falling edge encoding mode. Accordingly, sampling clock signal 204 may be recovered based on falling edges 210-3, 210-4 of encoded signal 203. Sampling clock recovery module 304 adapted to operate in falling edge mode then generates sampling instants $S_{1-1}$, $S_{1-2}$ based on falling edges 210-3, 210-4 of encoded data signal 203.

Table 3 below, shows the encoded bit sequences for 1:3, 1:4, 1:6, and 1:n for encoding original logic '1' and logic '0' data bits using a falling edge encoding technique.

TABLE 3

| Original Data Bit | 1:3 Encoded Data Bit | 1:4 Encoded Data Bit | 1:6 Encoded Data Bit | 1:n Encoded Data Bit |
|---|---|---|---|---|
| '1' | '011' | '0111' | '011111' | '$0_1 2_1 3_1 \ldots 1_{n-1} 1_n$' |
| '0' | '001' | '0001' | '000001' | '$0_1 0_2 0_3 \ldots 0_{n-1} 1_n$' |

Figure 2B:
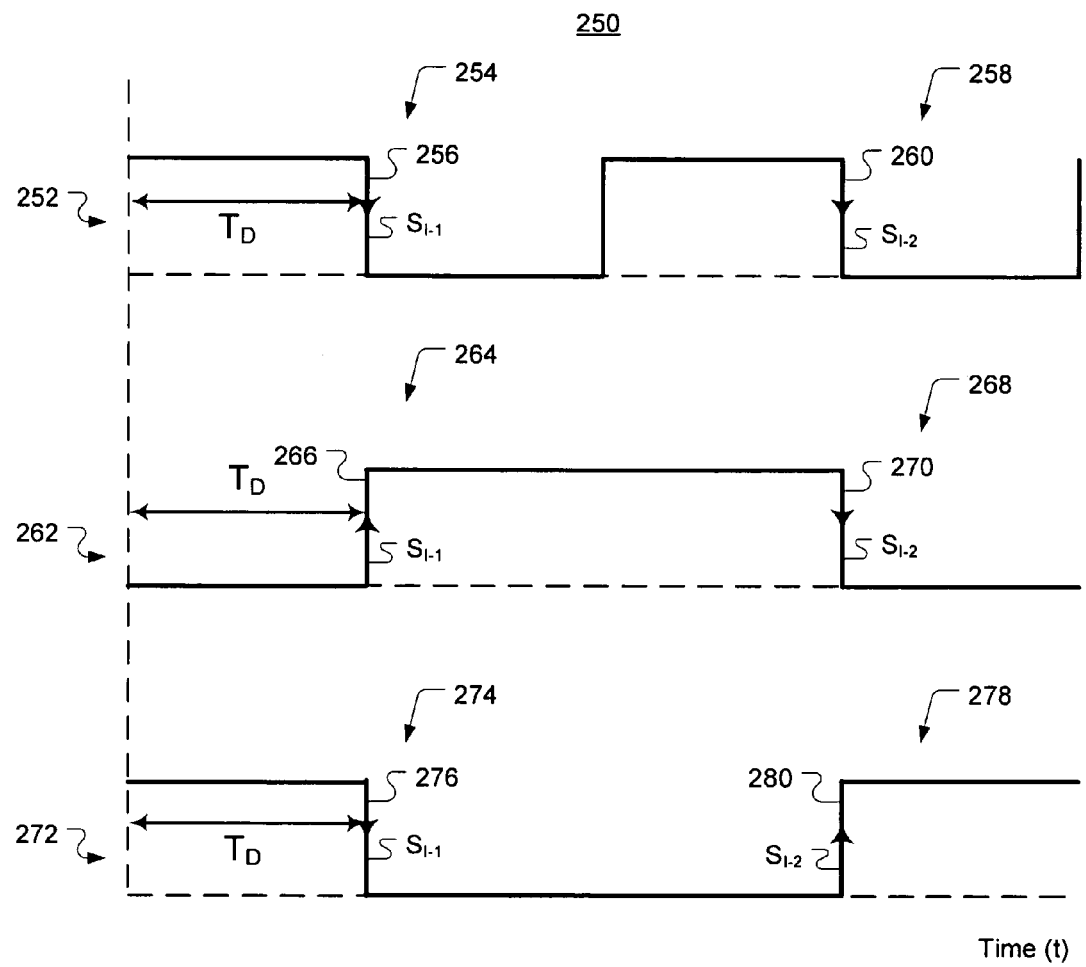
FIG. 2B illustrates various embodiments of recovered sampling clock signals
Figure 3:
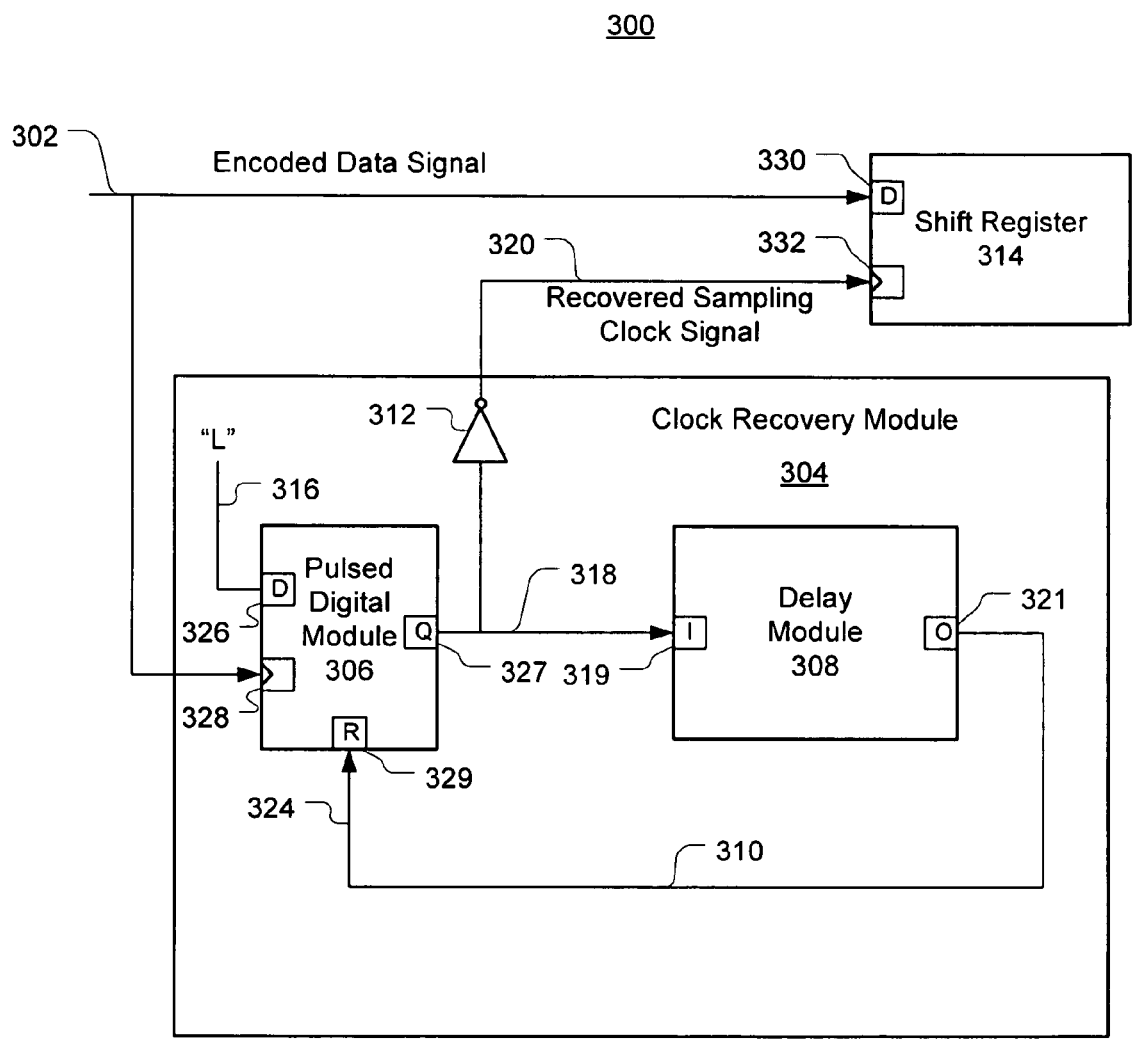
FIG. 3 illustrates one embodiment of a sampling clock recovery and data bit sampling system.

FIG. 2B illustrates various embodiments of recovered sampling clock signals 250. Sampling clock signal 252 is recovered from a falling edge clock recovery sampling technique. For example, a first logic bit sequence 254 is sampled at first sampling instant $S_{1-1}$ by sampling clock falling edge 256 as may be generated by sampling clock recovery module 304 (FIG. 3). Further, a second logic bit sequence 258 (e.g., the inverse of first logic bit sequence 254) is sampled at second sampling instant $S_{1-2}$ by sampling clock falling edge 260 as may be generated by sampling clock recovery module 304.

Sampling clock signal 262 is recovered from a rising and falling edge clock recovery sampling technique. For example, a first logic bit sequence 264 is sampled at first sampling instant $S_{1-1}$ by sampling clock rising edge 266 as may be generated by sampling clock recovery module 304. Further, a second logic bit sequence 268 (e.g., the inverse of first logic bit sequence 264) is sampled at second sampling instant $S_{1-2}$ by sampling clock falling edge 270 as may be generated by sampling clock recovery module 304.

Sampling clock signal 272 is recovered from a falling and rising edge clock recovery sampling technique. For example, a first logic bit sequence 274 is sampled at first sampling instant $S_{1-1}$ by sampling clock falling edge 276 as may be generated by sampling clock recovery module 304. Further, a second logic bit sequence 278 (e.g., the inverse of first logic bit sequence 274) is sampled at second sampling instant $S_{1-2}$ by sampling clock rising edge 280 as may be generated by sampling clock recovery module 304.

FIG. 3 illustrates one embodiment of a sampling clock recovery and data bit sampling system. FIG. 3 illustrates a system 300. System 300 comprises clock recovery module 304 to recover sampling clock signal 320 (e.g., sampling clock signal 204) from encoded data signal 302 (e.g., encoded data signal 202). System 300 also comprises shift-register 314 for capturing or storing the sampled bits and also for shifting the data bits of encoded data signal 302 under control of sampling clock signal 320. Encoded signal 302 comprises sampling clock signal 320 embedded in data bit sequences (e.g., original logic '1' bit sequences 206, 207 or original logic '0' bit sequences 208, 209). Encoded signal 302 may be encoded employing either rising or falling edge encoding techniques. In one embodiment, clock recovery module 304 comprises pulsed digital module 306, delay module 308, and inverter/buffer 312 arranged to generate sampling clock signal 320. Sampling clock signal 320 is extracted or recovered from encoded signal 302. The individual bits of encoded signal 302 may be sampled or strobed into shift register 314 on the rising or falling edges of sampling clock signal 320 depending upon particular implementations.

Pulsed digital module 306 comprises clock input 328 (>), data input 326 (D), data output 327 (Q), and reset input 329 (R). Encoded data signal 302 is fed to clock input 328. Data input 326 is held at logic level 'L' to capture either the rising or falling edges of encoded signal 302. The state of logic level 'L' depends on the particular rising or falling edge encoding technique employed. For example, as previously discussed, clock recovery module 304 may operate in rising edge or falling edge modes. In rising edge mode, clock recovery module 304 responds to the rising edge of encoded signal 302 when logic level 'L' is held high or set to logic '1'. This captures the incoming rising edges of encoded signal 302. When an incoming rising edge is captured, signal 318 at data output 327 of pulsed digital module 306 drives delay input port 319 of delay module 308. In another embodiment, clock recovery module 304 may operate in falling edge mode and clock recovery module 304 responds to the falling edges of incoming encoded signal 302 when logic level 'L' is held low or set to logic '0'. This captures the incoming falling edges of encoded data signal 302. When an incoming falling edge is captured, signal 318 at data output 327 of pulsed digital module 306 drives delay input port 319 of delay module 308. In one embodiment, pulsed digital module 306 may comprises a delay flip-flop (DFF), for example.

In the following example, clock recovery module 304 is configured to receive encoded signal 302. Encoded signal 302 is a 1:6 CPWM encoded signal as previously described with reference to FIG. 2A. In the illustrated embodiment, encoded signal 302 is a rising edge encoded signal. System 300 is configured to strobe or sample encoded signal 302 on rising edges. Encoded signal 302 is processed by clock recovery module 304 to extract sampling clock signal 320. Sampling clock signal 320 clocks shift-register 314 to capture or store incoming original data bits and to shift the bits of encoded signal 302 based on rising edges of sampling clock signal 320. This is an illustrative example and the embodiments are not limited in this context. For example, system 300 may be adapted to operate with other encoded data signals either in rising or falling edge mode. In addition, data signal bits may be shifted or clocked based on either rising or falling edges of recovered sampling clock signal 320. The following description references both FIGS. 2A, B and 3.

Delay module 308 comprises input port 319 (I) and output port 321 (O). Delay module 308 delays signal 318 by some fractional portion of encoding clock period $T_{CLK}$ (or some factor of $T_{CLK}$). In one embodiment, signal 318 may be delayed an equivalent of one-half of the encoding clock period $T_{CLK}$ after detecting a first rising edge of encoded signal 302. If $T_{CLK}$ is the encoding clock period, then for a 1:6 encoding technique, the total time taken to encode encoded signal 302 is $6 \cdot T_{CLK}$. If delay module 308 delays the captured edge of encoded signal 302, e.g., the rising edge in this case, by one-half of the encoding clock period $T_{ENC}$, incoming rising edge of encoded signal 302 is delayed by $3 \cdot T_{CLK}$ before a sampling instant occurs and a first rising edge of sampling clock signal 320 is generated.

Once delay module 308 generates a suitable delay (e.g., $T_D$), delay signal 310 at delay output port 321 of delay module 308 is fed to reset input 329 of pulsed digital module 306. Upon receiving delay signal 310 (e.g., $T_D$), pulsed digital module 306 resets signal 318 to a default state where it no longer drives delay module 308. The first sampling instant at the first rising edge of sampling clock signal 320 occurs when delay signal 310 resets pulsed digital module 306. Signal 318 remains in the default state until the next rising edge of encoded signal 302 sequence arrives at clock input 328 of pulsed digital module 306. At that point, signal 318 drives delay module 308 and the process is repeated. After a second rising edge of encoded data signal 302 is detected by pulsed digital module 306, delay signal 310 resets pulsed digital module 306 and, thus, resets signal 318 to a default state where it no longer drives delay module 308. The second sampling instant at the second rising edge of sampling clock signal 320 occurs when delay signal 310 resets pulsed digital module 306.

Signal 318 may be inverted by inverted/buffer 312 or simply buffered. Inverter/buffer 312 generates sampling clock signal 320 at its output. Inverted/buffer 312 drives clock input 332 of shift-register 314 with sampling clock signal 320. The incoming bits of encoded data signal 302 are sampled or strobed into shift-register 314 by sampling clock signal 320. As previously discussed, encoded data signal 302 may be sampled either at the rising edges or at the falling edges of recovered sampling clock signal 320.

In one embodiment, delay module 308 may be implemented in a number of ways. For example, in the illustrated embodiment, delay module 308 may be implemented using an oscillator driving a counter and comparing its output with one or more delay select options. When the counter value matches the delay select options, for example, the output 321 of delay module 308 changes state and provides a suitable delay.

Figure 4:
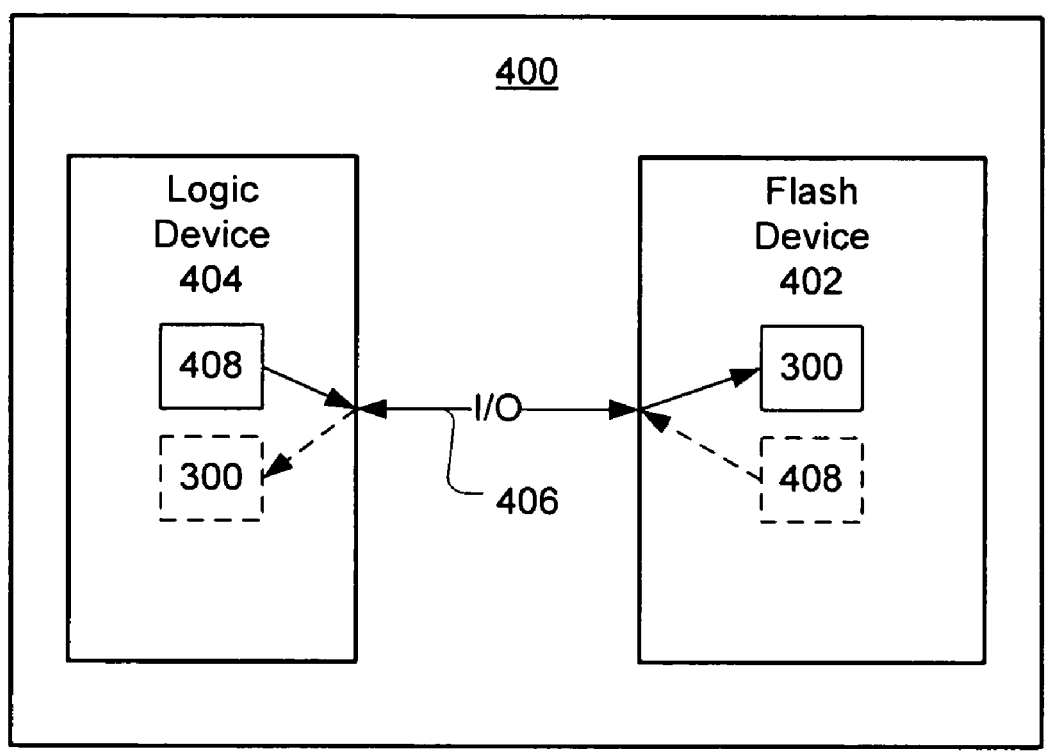
FIG. 4 illustrates one embodiment of system comprising a single-wire flash memory device.

In one embodiment, system 300 comprising, for example, clock recovery module 304 and bit sampling shift register 314, may be provided in a flash memory device to recover sampling clock signals encoded in a CPWM encoded signal, for example. Accordingly, FIG. 4 illustrates one embodiment of a system comprising a single-wire flash memory device. FIG. 4 illustrates a system 400. System 400 may be representative of a system or architecture suitable for use with one or more embodiments described herein, such as the PCWM encoding techniques described with reference to diagram 200 and system 300, and so forth.

As shown in FIG. 4 system 400 comprises logic device 404 coupled to flash device 402 via single-wire serial I/O link 406. Flash device 402 may a memory device. Flash device 402 comprises system 300, which may include, clock recovery module 304 and shift-register 314, for example. System 400 may comprise or may form a portion of a digital video disk (DVD) (or digital versatile disk) drive, compact disk (CD) drive, digital radio, digital subscriber line (DSL) and/or cable modems, MP3 (moving pictures expert group audio layer-3) players, wireless local area networks (LAN), liquid crystal display (LCD) monitors, printers, networking, hard disk drives, set-top box, personal computer (PC) basic input/output system (BIOS), DVD recorders, industrial field programmable gate arrays (FPGAs), programmable logic device (PLD), global positioning system (GPS), digital signal processors (DSPs), cellular telephone, personal digital assistant (PDA), smart-phone, among other systems, devices, and/or components. In one embodiment, system 400 may be a flash memory DFT system. Logic device 404 encodes and transmits encoded data signal 202 over single-wire serial I/O link 406 to flash device 402.

Logic device 404 may comprise an encoder module 408 to encode and/or transmit encoded data signals 202, 203, 302. Logic device 404 and/or encoder module 408 may comprise, for example, a processor, DSP, FPGA, baseband processor, PLD, and any data processing device that may be used to implement any of the encoding techniques discussed herein to communicate encoded data signals 202, 203, 302 over single-wire serial I/O link 406. Logic device 404 may be coupled to flash device 402 through single-wire serial I/O link 406. Accordingly, logic device 404 serially interfaces with flash device 402 via single-wire serial I/O link 406. It will be appreciated that communication between logic device 404 and flash device 402 may be bidirectional. In one embodiment, logic device 404 may comprise encoder module 408, clock recovery module 304, and/or shift register 314 (e.g., system 300). In one embodiment logic device 404 may be able to send encoded data (e.g., encoded signal 302) to flash device 402 and receive encoded data from flash device 402 and recover a sampling clock signal (e.g., sampling clock signal 320) therefrom. Similarly, in one embodiment, flash device 402 also may comprise an encoder module 408 in addition to clock recovery module 304, and/or shift register 314 (e.g., system 300). In one embodiment flash device 402 may be able to send encoded data (e.g., encoded signal 302) to logic device 404 and receive encoded data from logic device 404 and recover a sampling clock signal (e.g., sampling clock signal 320) therefrom. The embodiments are not limited in this context.

In various embodiments, system 400 may be implemented as a wireless system, a wired system, or a combination of both. When implemented as a wireless system, system 400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 400 may include components and interfaces suitable for communicating over single wired communications media, such as I/O adapters, physical connectors to connect the I/O adapter with a corresponding wired communications medium. Examples of wired communications media may include a wire, cable, metal leads, printed circuit board (PCB), backplane, switch fabric, semiconductor material, twisted-pair wire, co-axial cable, fiber optics, and so forth.

In various embodiments, system 400 flash device 402 comprising clock recovery system 300 and/or sampling clock recovery module 304 and/or logic device 404 may connect to other devices over one or more communication media. Flash device 403 and/or logic device 404 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner.

In various implementations, systems 300, 400 may be illustrated and described as comprising several separate functional elements, such as modules and/or blocks. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, DSPs, PLDs, FPGAs, ASICs, circuits, registers), software components (e.g., programs, subroutines, logic) and/or combination thereof.

In various embodiments, systems 300, 400 may comprise multiple modules connected by one or more communications media. The modules may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
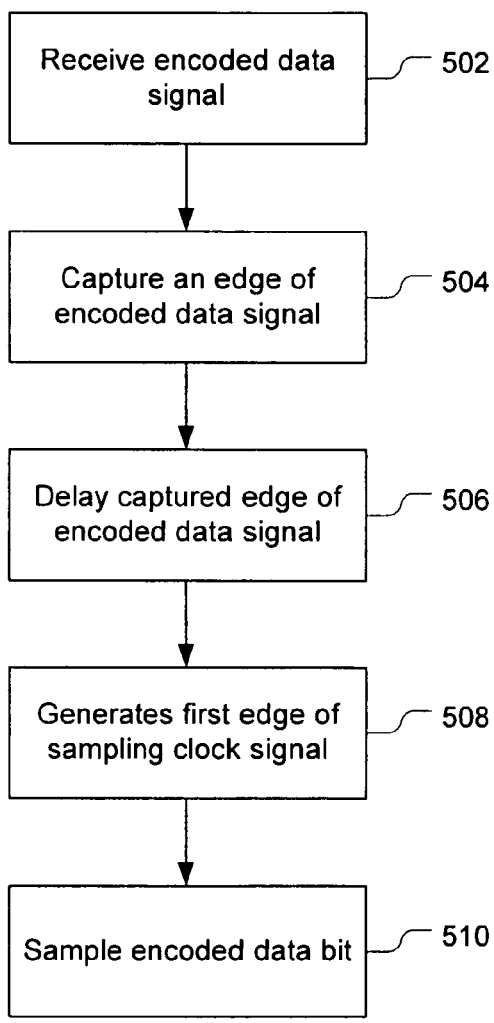
FIG. 5 illustrates one embodiment of a logic flow to recover a sampling clock signal from a single encoded signal comprising a data signal and a sampling clock signal.

FIG. 5 illustrates one embodiment of a logic flow to recover a sampling clock signal from a single encoded signal comprising a data signal and a sampling clock signal. FIG. 5 illustrates a logic flow 500. Logic flow 500 may be representative of the operations executed by one or more embodiments described herein. As shown in logic flow 500, clock recovery module 304 receives (502) an encoded data signal 202 (or 203, 302, for example) on a single-wire. Said encoded data signal 202 comprising a sampling clock signal 204 (or 320, for example) embedded encoded data bit 206 (or 207, 208, 209, for example). Clock recovery module 304 recovers embedded sampling clock signal 204 (or 320, for example) using, for example, pulsed digital module, delay module, and feedback signal. Pulsed digital module 306 captures (504) an edge of encoded data signal 202 (or 203, 302, for example). Delay module 308 delays (506) captured edge of encoded data signal 202 by a predetermined period $T_D$. After the predetermined period $T_D$, clock recovery module 304 generates (508) a first edge (e.g., 212-1) of sampling clock signal 204. The sampling clock signal 204 edge samples (510) encoded data bit 206 at the first edge of sampling clock signal 204.

In one embodiment, clock recovery module 304 detects a rising edge 110-1 of encoded data signal 202 and shift-register 314 captures and/or shifts encoded data bit 206 at the first edge 212-1 of sampling clock signal 204. In another embodiment, clock recovery module 304 detects a falling edge of encoded data signal 202 and shift-register 314 captures and/or shifts encoded data bit 206 at the first edge 212-1 of sampling clock signal 204. In one embodiment, clock recovery module 304 receives n bits representing clock signal 204 embedded encoded data bit 206 and sampling clock signal 204 on a single-wire. In one embodiment, the n bits comprise a first encoding period $T_{ENC}$ and delays the captured edge of encoded data signal 202 by one-half of encoding period $T_{ENC}$.

Figure 6:
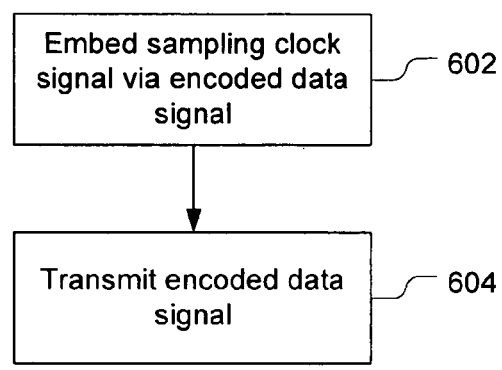
FIG. 6 illustrates one embodiment of a logic flow to encode a data signal and a sampling clock signal in a single encoded signal.

FIG. 6 illustrates one embodiment of a logic flow to encode a data signal and a sampling clock signal in a single encoded signal. FIG. 6 illustrates a logic flow 600. Logic flow 600 may be representative of the operations executed by one or more embodiments described herein. As shown in logic flow 600, logic device 404 embed (602) a sampling clock signal 204 (or 320, for example) via an encoded data signal 202 (or 203, 302, for comprising n bits, encoded data signal 202 (or 203, 302, for example) represents a logic bit, e.g., a logic '1' or a logic '0' bit, the bit having an encoding clock period $T_{CLK}$. Logic device 404 transmits (604) encoded data signal 202 to a single-wire as a serial bit sequence of n bits. In one embodiment, encoded data signal 202 is a pulse of predetermined width equal to $n \cdot T_{CLK}$, and the leading bit or the trailing bit of the n bits comprising encoded signal 202 is logically inverted relative to the remaining n-1 bits. For example, as previously described with reference to Tables 1 and 3. In one embodiment, a rising edge 210-1, 210-2 (or 210-3, 210-4, for example) may be encoded after each n bit of said serial single-wire bit sequence of n bits. In one embodiment, a falling edge may be encoded after each n bit of said serial single-wire bit sequence of n bits. In one embodiment, encoded data signal 202 may be encoded such that the encoding clock period $T_{CLK}$ is related to the sampling window period $T_{SW}$ to decode encoded data signal 202 and extract sampling clock signal 204 according to the relationship $T_{SW} = \pm[(n-2)/2]T_{CLK}$.

In general operation, systems 300 and 400 may receive an encoded data signal 202 comprising encoded data bit 206 (or 207, 208, 209, for example) and a sampling clock signal 204 on a single-wire and delay encoded data signal 202 by a predetermined period $T_D$. A first edge (e.g., 212-1) of sampling clock signal 204 may be generated after the predetermined period $T_D$ elapses. Encoded data bit 206 may be sampled at the first edge of sampling clock signal 204. In one embodiment, systems 300, 400 detect either a rising edge or a falling edge of encoded data signal 202 and shift encoded data bits 206 at the first edge 212-1 of sampling clock signal 204. In one embodiment, systems 300, 400 receive n bits representing encoded data bit 206 and the sampling clock signal 204 on a single-wire. In one embodiment, the n bits comprise a first encoding clock period $T_{CLK}$ and delays the captured edge of encoded data signal 202 by one-half of encoding clock period $T_{CLK}$.

In general operation, system 400 may embed a clock signal within an encoded signal comprising n bits, the encoded signal represents a logic '1' or a logic '0' bit, the bit having an encoding clock period $T_{CLK}$. System 400 may transmit the encoded signal as a serial single-wire bit sequence of n bits. In one embodiment, the logic '1' and the logic '0' may be represented with a pulse of a different width. In one embodiment, a rising edge may be encoded after each n bit of said serial single-wire bit sequence of n bits. In one embodiment, a falling edge may be encoded after each n bit of said serial single-wire bit sequence of n bits. In one embodiment, the encoded signal may be encoded such that the encoding clock period $T_{CLK}$ is related to the sampling window period $T_{SW}$ to decode encoded data signal 202 and extract sampling clock signal 204 according to the relationship $T_{SW} = \pm[(n-2)/2]T_{CLK}$.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a pulsed digital module comprising a first clock input, a first data input, a data output, and a reset input, said first clock input to receive an encoded signal from a single-wire, said encoded signal comprising a serial bit sequence comprising a clock signal embedded encoded data bit, said pulsed digital module to capture an edge of said encoded signal at said first clock input in accordance with a logic level coupled to said first data input; and
a delay module comprising a delay input coupled to said data output and a delay output coupled to said reset input, said delay module to delay said captured edge by a predetermined period and to generate a delay signal from said delay output after said predetermined period; wherein said pulsed digital module is to generate a first clock edge of said sampling clock at said data output after said predetermined period.

2. The apparatus of claim 1, comprising:
a shift register comprising a second clock input coupled to said data output and a second data input to receive said encoded signal, said shift register to sample said encoded signal at said first clock edge of said sampling clock.

3. The apparatus of claim 1, wherein said pulsed digital module to capture a rising edge at said first clock input in accordance with a high logic level coupled to said first data input.

4. The apparatus of claim 1, wherein said pulsed digital module to capture a falling edge at said first clock input in accordance with a low logic level coupled to said first data input.

5. The apparatus of claim 1, wherein said encoded signal is encoded with an encoding clock period $T_{CLK}$ and a sampling window period $T_{sw}$ is defined as:

$$T_{SW} = \pm[(n-2)/2]T_{CLK};$$

wherein said encoded signal comprises n bits.

6. A system, comprising:
a flash memory coupled to a single-wire serial link; and
a pulsed digital module coupled to said single-wire serial link, said pulsed digital module comprising a first clock input, a first data input, a data output, and a reset input, said first clock input to receive an encoded signal from said single-wire serial link, said encoded signal comprising a serial bit sequence comprising a clock signal embedded data bit, said pulsed digital module to capture an edge of said encoded signal at said first clock input in accordance with a logic level coupled to said first data input; and
a delay module comprising a delay input coupled to said data output and a delay output coupled to said reset input, said delay module to delay said captured edge by a predetermined period and to generate a delay signal from said delay output after said predetermined period;
wherein said pulsed digital module is to generate a first clock edge of said sampling clock at said data output after said predetermined period.

7. The system of claim 6, comprising:
a shift register comprising a second clock input coupled to said data output and a second data input to receive said encoded signal, said shift register to sample said encoded signal at said first clock edge of said sampling clock.

8. The system of claim 6, wherein said pulsed digital module to capture a rising edge at said first clock input in accordance with a high logic level coupled to said first data input.

9. The system of claim 6, wherein said pulsed digital module to capture a falling edge at said first clock input in accordance with a low logic level coupled to said first data input.

10. The system of claim 6, wherein said encoded signal is encoded with an encoding clock period $T_{CLK}$ and a sampling window period $T_{sw}$ is defined as:

$$T_{SW} = \pm[(n-2)/2]T_{CLK};$$

wherein said encoded signal comprises n bits.

11. A method, comprising:
embedding a sampling clock signal via an encoded signal comprising n bits, said encoded signal represents a logic bit having an encoding clock period $T_{CLK}$;
transmitting said encoded signal to a single-wire as a serial bit sequence of n bits;
encoding an edge after each n bit of said serial single-wire bit sequence of n bits.

12. The method of claim 11, comprising:
representing said encoded signal is a pulse of a predetermined width;
wherein a leading bit or a trailing bit of said n bits comprising said encoded signal is logically inverted relative to the remaining n-1 bits.

13. The method of claim 11, wherein said encoding an edge comprises:
encoding a rising edge after each n bit of said serial single-wire bit sequence of n bits.

14. The method of claim 11, wherein said encoding an edge comprises:
encoding a falling edge after each n bit of said serial single-wire bit sequence of n bits.

15. The method of claim 11, comprising:
encoding said encoded signal to be decoded by a sampling window period $T_{SW}$ determined by the relationship $T_{sw} = \pm[(n-2)/2]T_{CLK}$.

16. An apparatus, comprising:
an encoder to embed a sampling clock signal via an encoded signal comprising n bits, said encoded signal represents a logic bit having an encoding clock period $T_{CLK}$; and
to transmit said encoded signal to a single-wire as a serial bit sequence of n bits, wherein said encoder is to encode an edge after each n bit of said serial single-wire bit sequence of n bits.

17. The apparatus of claim 16, wherein said encoder is to represent said encoded signal as a pulse of a predetermined width, wherein a leading bit or a trailing bit of said n bits comprising said encoded signal is logically inverted relative to the remaining n-1 bits.

18. The apparatus of claim 16, wherein said edge is a rising edge.

19. The apparatus of claim 16, wherein said edge is a falling edge.

20. The apparatus of claim 16, wherein said encoder is to encode said encoded signal to be decoded by a sampling window period $T_{sw}$ determined by the relationship $T_{sw} = \pm[(n-2)/2]T_{CLK}$.

21. An article comprising a machine-readable storage medium containing instructions that if executed enable a system to embed a sampling clock signal via an encoded signal comprising n bits, said encoded signal represents a logic bit having an encoding clock period $T_{CLK}$; encode an edge after each n bit of said serial single-wire bit sequence of n bits; and transmit said encoded signal to a single-wire as a serial bit sequence of n bits.

22. The article of claim 21, further comprising instructions that if executed enable the system to represent said encoded signal as a pulse of a predetermined width; and to logically invert a leading bit or a trailing bit of said n bits comprising said encoded signal relative to the remaining n-1 bits.

23. The article of claim 21, wherein the edge is a rising edge.

24. The article of claim 21, wherein the edge is a falling edge.

25. The article of claim 21, further comprising instructions that if executed enable the system to encode said encoded signal to be decoded by a sampling window period $T_{sw}$ determined by the relationship $T_{sw} = \pm[(n-2)/2]T_{CLK}$.

* * * * *